(12) United States Patent
Chen et al.

(10) Patent No.: US 6,449,706 B1
(45) Date of Patent: Sep. 10, 2002

(54) METHOD AND APPARATUS FOR ACCESSING UNALIGNED DATA

(75) Inventors: Yen-Kuang Chen, Franklin Park, NJ (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,015

(22) Filed: Dec. 22, 1999

(51) Int. Cl.[7] ............................................. G06F 12/00
(52) U.S. Cl. ..................... 711/201; 711/213; 711/220
(58) Field of Search ................... 711/5, 3, 201, 711/213, 220, 206; 712/224, 220, 300, 237; 365/230.05; 708/654

(56) References Cited

U.S. PATENT DOCUMENTS

| | | | | |
|---|---|---|---|---|
| 4,569,016 A | * | 2/1986 | Hao et al. .................. 712/224 |
| 5,249,280 A | * | 9/1993 | Nash et al. ................. 711/5 |
| 5,386,531 A | * | 1/1995 | Blaner et al. ............... 711/201 |
| 5,502,683 A | * | 3/1996 | Marchioro ............... 365/230.05 |
| 5,715,421 A | * | 2/1998 | Akiyama et al. ........... 711/213 |
| 5,900,023 A | * | 5/1999 | Pase .......................... 711/220 |
| 5,931,945 A | * | 8/1999 | Yung et al. ................ 712/300 |
| 5,940,870 A | * | 8/1999 | Chi et al. ................... 711/206 |
| 5,995,746 A | * | 11/1999 | Sites et al. ................. 712/220 |
| 6,108,745 A | * | 8/2000 | Gupta et al. ................. 711/3 |
| 6,128,639 A | * | 10/2000 | Pase .......................... 708/654 |
| 6,167,509 A | * | 12/2000 | Sites et al. ................. 712/237 |

* cited by examiner

*Primary Examiner*—David Hudspeth
*Assistant Examiner*—Fred F. Tzeng
(74) *Attorney, Agent, or Firm*—Blakely, Sokoloff, Taylor & Zafman LLP

(57) ABSTRACT

A method and apparatus for accessing data from a memory. The method includes masking off a portion of a first memory address, and accessing a first unit of data corresponding to the first memory address. In addition, the method includes adding a predetermined offset to the first memory address to generate a second memory address, and accessing a second unit of data corresponding to the second memory address. Thereafter, a section of the first unit of data is shifted off, and a separate section from the second unit of data is shifted off. Next, the first unit of data and the second unit of data are joined.

13 Claims, 5 Drawing Sheets

US 6,449,706 B1

METHOD AND APPARATUS FOR ACCESSING UNALIGNED DATA

FIELD OF THE INVENTION

The present invention relates computers, and, in particular, accessing unaligned data from a memory device.

BACKGROUND OF THE INVENTION

Memory lines are typically divided into cache line boundaries. In the example illustrated in FIG. 1, the cache lines are sub-divided into 8-byte boundaries. If a memory address corresponds to a boundary line, the memory address is considered an "aligned access". If a memory address does not corresponds to a boundary line it is considered an unaligned access, and can typically take 2.5 times longer to access.

The number of unaligned access is typically high in computer applications. As a result, the memory latency associated with the unaligned accesses creates a bottleneck effect that limits the performance of image/video processing and other applications.

SUMMARY OF THE INVENTION

The present invention provides a method and apparatus for accessing data from a memory. The method includes masking off a portion of a first memory address, and accessing a first unit of data corresponding to the first memory address. In addition, the method includes adding a predetermined offset to the first memory address to generate a second memory address, and accessing a second unit of data corresponding to the second memory address. Thereafter, a section of the first unit of data is shifted off, and a separate section from the second unit of data is shifted off. Next, the first unit of data and the second unit of data are joined.

DETAILED DESCRIPTION

A method and apparatus for accessing unaligned or segmented data is disclosed. In the following description, for purposes of explanation, specific nomenclature is set forth to provide a thorough understanding of the present invention. However, it will be apparent to one skilled in the art that these specific details are not required in order to practice the present invention. For example, the present invention at times herein may be described with reference to the Intel architecture and the related instruction set. However, the same techniques can be applied to other processor architectures and instruction sets.

Packed Data Formats and Related MMX Instructions

In one embodiment, the method and apparatus for accessing unaligned data, is provided for accessing data units stored in packed data formats in the memory/cache. For example, in one embodiment, the data is grouped in sixty-four-bit data groups. The packed data can typically be in one of three formats: a packed byte format, a packed word format, or a packed double word (dword) format. Packed data in a packed byte format includes eight separate 8-bit data elements. Packed data in a packed word format includes four separate 16-bit data elements and packed data in a packed dword format includes two separate 32-bit data elements. The packed data is typically operated on in multimedia registers 64 bits in length.

In one embodiment described herein, the packed data is accessed using a routine consisting, in part, of instructions selected from the Intel MMX instruction set. In alternative embodiments, other similar packed data instruction sets could be used without departing from the present invention. The Intel MMX instructions that are used in one embodiment are discussed below.

Figure 1:
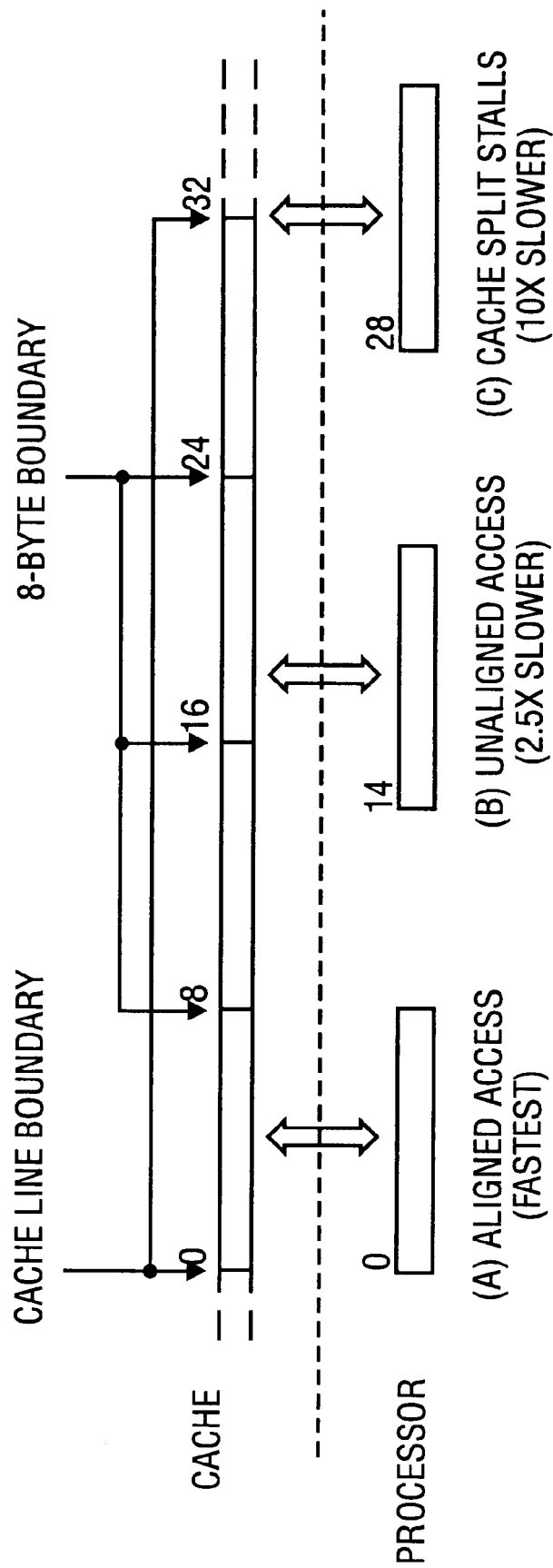
FIG. 1 illustrates cache lines sub-divided into cache line boundaries.
Figure 2:
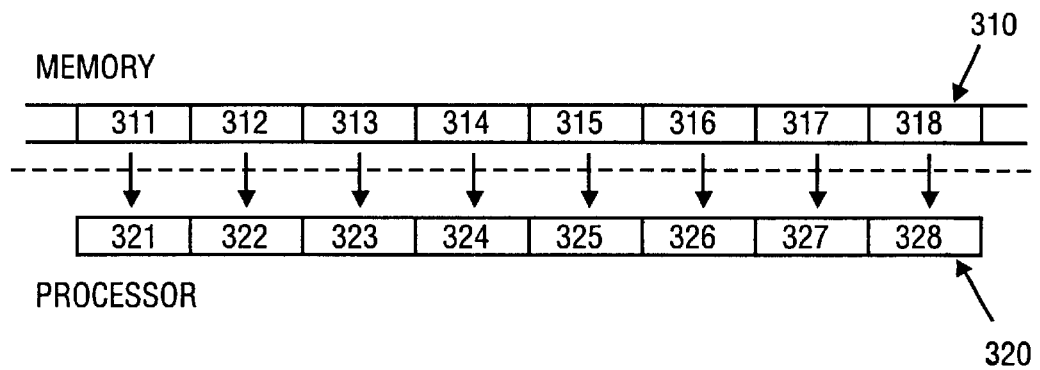
FIG. 2 illustrates the MOVQ operation used in one embodiment in the method of the present invention.

FIG. 2 illustrates an example of the MOVQ instruction. The MOVQ instruction is used to transfer sixty-four data bits, eight packed bytes, to and from the registers. As shown in FIG. 2, packed data 310, having packed bytes 311, 312, 313, 314, 315, 316, 317 and 318 located in memory are transferred to a register, and stored as data elements 321, 322, 323, 324, 325, 326, 327 and 328.

Figure 3:
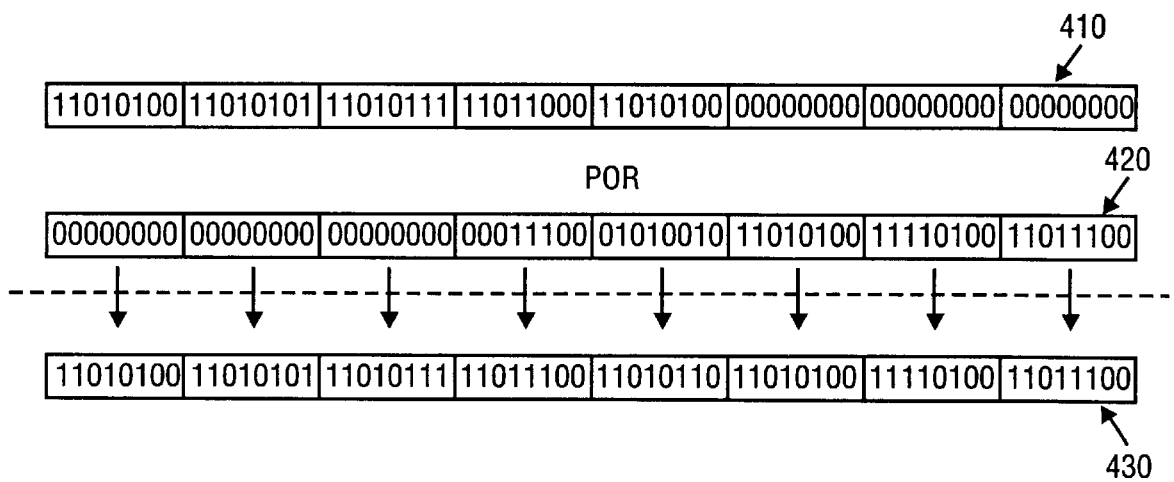
FIGS. 3 illustrates the packed bit-wise logical OR operation used in one embodiment in the method of the present invention.

FIG. 3 illustrates the POR operation. In the POR operation a bit-wise logical OR is performed on packed data sequence 410 and 420. The result is placed in packed data sequence 430 as illustrated in FIG. 3.

Figure 4:
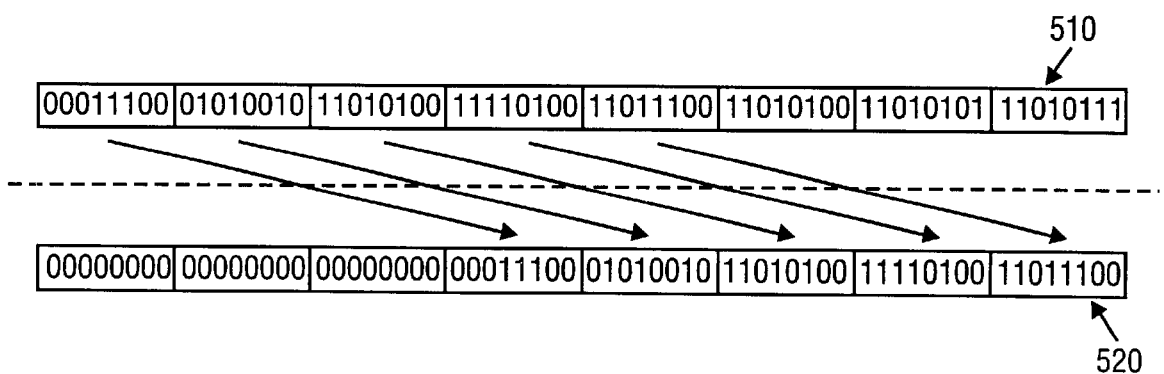
FIG. 4 illustrates the packed shift right logical operation used in one embodiment in the method of the present invention.

FIG. 4 illustrates the PSRL (Pack Shift Right Logical) instruction. The instruction independently shifts each data element of packed data sequence 510 to the right by the scalar shift count. In order to shift each individual packed word, double word, or the entire packed data sequence, by the shift count, the PSRL instruction is codified as PSRLW, PSRLD, or PSRLQ, respectively. The high-order bits of each element are filled with zero. The shift count is interpreted as unsigned.

The PSLL (Pack Shift Left Logical) instruction is performed in the same manner as the PSRL instruction. In the PSLL instruction, each data element is independently shifted to the left by scalar shift count. Moreover, the lower order bits of each element are filled with zeros. In order to shift each individual packed word, or double word, by the shift count, the PSLL instruction is codified as PSLLW and PSLLD.

Method for Accessing Unaligned Data

Figure 5A:
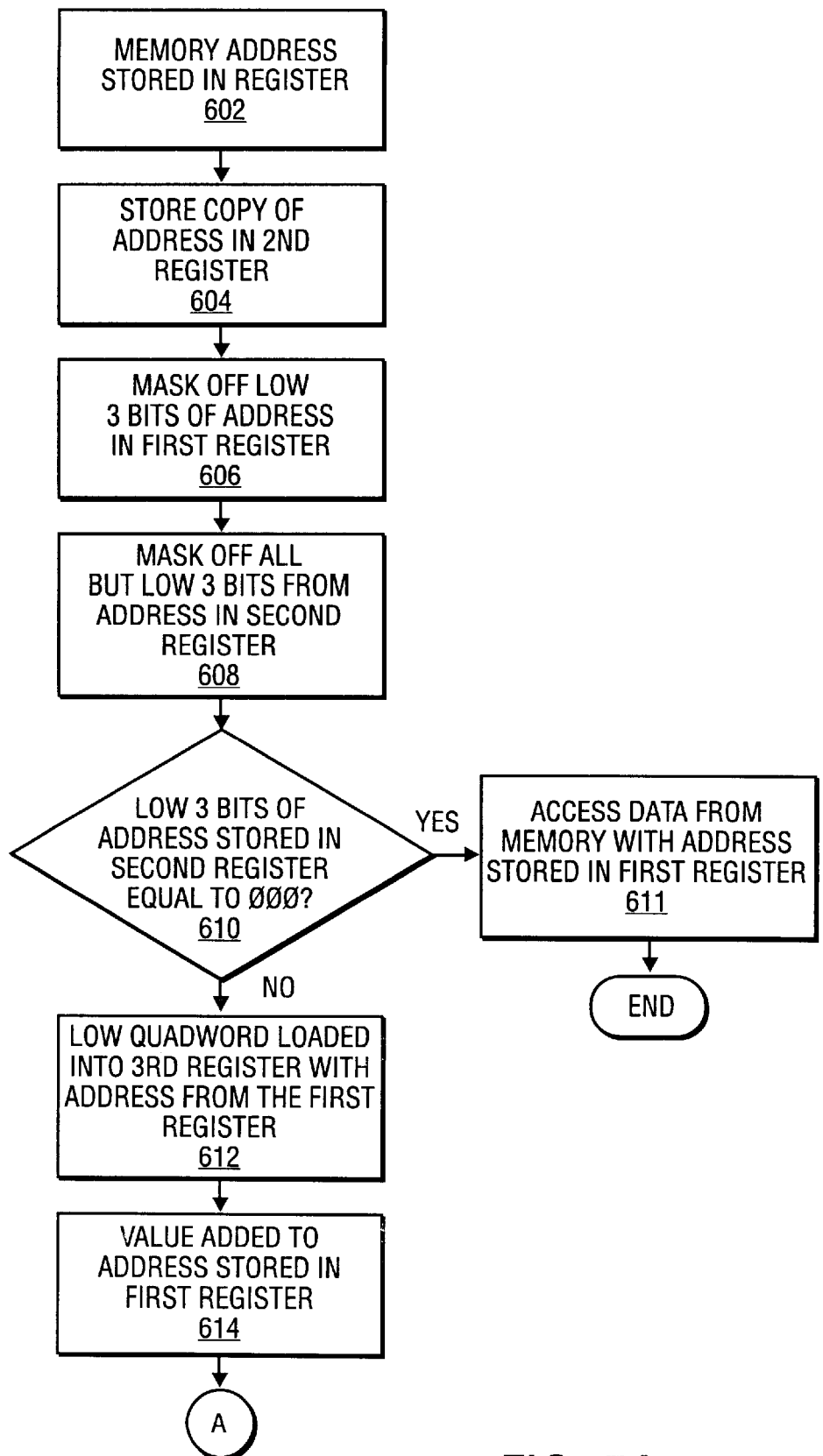
FIGS. 5a–b illustrate a flow diagram describing the steps of accessing cache-aligned data according to one embodiment.
Figure 5B:
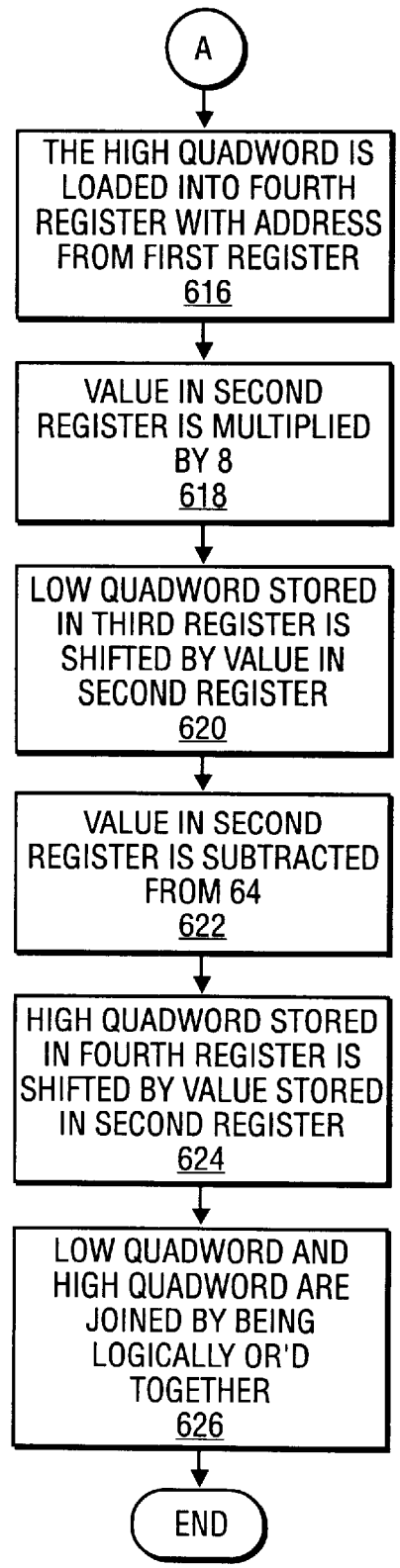

FIGS. 5a–b illustrate a flow diagram describing the steps for an improved method of accessing unaligned data with memory address that corresponds to a unit of data unaligned with a cache-line/quadword boundary (hereinafter referred to as the "unaligned memory address"). The embodiment described below is provided with reference to accessing a cache/memory device with eight byte line boundaries. In alternative embodiments, the steps below could be modified to access cache devices having different length boundaries.

In step 602, the memory address for a unit of data (e.g., a quadword, 8 bytes), which may or may not be aligned with a quadword boundary, is stored in a first register. Subsequent step(s) of the method determine whether the memory address is aligned with a quadword boundary. If the memory address is not aligned, innovative subsequent steps of the method access the data in a faster manner. In step 604, a copy of the memory address is stored in a second register.

In step 606, an address for the lower quadword boundary to the left of unaligned unit of data, is generated. In one embodiment, the address for the lower quadword boundary (aligned memory address) to the left is generated by masking off the low order 3 bits of the first copy of the unaligned memory address, stored in the first register. By clearing the 3 low order bits of the first copy of the unaligned memory address, it has the effect of decreasing value of the memory address by up to 7, which corresponds with 7 byte positions to the left. In one embodiment, the bits are masked off by performing a logical AND operation between the first copy of the unaligned memory address and the value 0xfffffff8.

In step 608, all bits but for the low order 3 bits are masked off of the second copy of the unaligned memory address, stored in the second register. The result indicates how far off the memory address is from the quadword boundary to the left. In step 610, it is determined whether the results of step 608 equal 000. If the results of step 608 equal 000, the original memory address is aligned with quadword boundary. As a result, in step 611 the address stored in the first registers is used to access a quadword and the steps of the method are completed.

On the other hand, if the results of step 608 do not equal 000, then in step 612, using the aligned memory address stored in the first register, a unit of data is loaded from the cache to a third register (herein after referred to as the lower quad word). In an embodiment using MMX instructions, the MOVQ instruction is used to transfer the low quadword into the third register.

In step 614, a value is added to the memory address stored in the first register to have the memory address correspond to the next higher quadword boundary to the right. Considering a quadword consists of eight bytes, a value of 8 is added to the memory address stored in the first register. In step 616, the modified memory address stored in the first register is used to load a unit of data from the memory/cache into a fourth register (hereinafter referred to as the higher quaword). In an embodiment using MMX instructions, the MOVQ instruction is used to transfer the data.

Next the lower quadword is to be shifted by a scalar count to eliminate the unnecessary bytes from the lower quadword (i.e., the bytes between low quadword boundary and the byte that corresponded to the original memory address.) Recall that the value stored in the second register (the original memory address with all but the low 3 bits masked off) represents the number of bytes the original memory address was offset from lower quadword boundary. However, in one embodiment using MMX instructions, the shift count value represents the number of bit positions to be shifted rather than bytes. As a result, in step 618, the value stored in the second register is to be converted to represent the number of bits to be shifted/removed, by multiplying the value by 8. In one embodiment, the value in the second register is shifted to the left by 3 bit positions (in the case of an embodiment where value are stored in registers with the low order to the right and high order to the left.)

In step 620, the lower quadword is shifted by a number of bit positions equal to the converted value stored in the second register, generated in step 618. In one embodiment, the low quadword is right shifted by executing a PSLQ, in an embodiment using MMX instructions. Shifted to the left in an embodiment implementing on Intel architecture because data is stored in registers in the Intel architecture with high order to the left and low order to the right.

In step 622, the number of bytes to be removed from the high quadword is determined. In one embodiment, the number of bytes to be removed is determined by subtracting from 64 (eight bytes) the converted value stored in the second register, with the result stored in the second register. Thereafter, in step 624, the high quadword is left shifted a number of bit positions equal to the new value stored in the second register. In an alternative embodiment, the shift values for the high quadword and low quadword could be predetermined and loaded into a register as needed.

In step 626, the shifted low quadword stored in the third register, and the shifted high quadword stored in the fourth register are joined by performing a logically OR operation (POR in the case of MMX) between the two quadwords. As a result, the original unaligned quadword addressed by the original unaligned memory address has been obtained, but has been obtained via two aligned-memory accesses, which is significantly faster than performing a single unaligned memory access.

Figure 6:
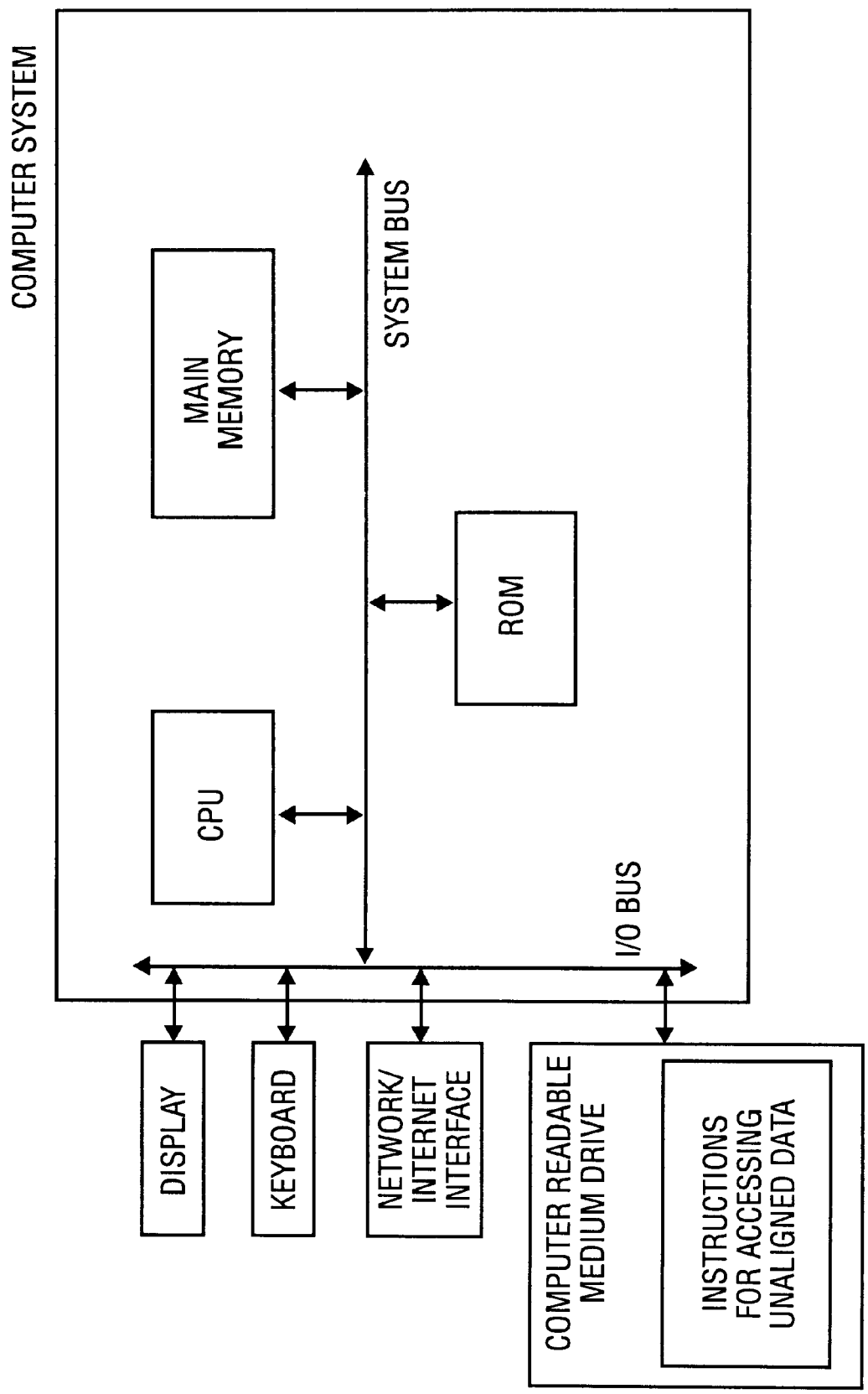
FIG. 6 illustrates a computer system having a computer readable medium with instructions stored thereon according to one embodiment of the present invention.

The method for performing the unaligned memory access as described above can be provided in applications (e.g., video applications) to potentially increase the performance of the applications by decreasing the time to perform unaligned memory accesses. Moreover, applications that include the method as described above, can be stored in memory of a computer system as a set of instructions to be executed. In addition, the instructions to perform the methods as described above could alternatively be stored on other forms of computer-readable medium, including magnetic and optical disks. For example, method of the present invention can be stored on computer-readable mediums, such as magnetic disks or optical disks, that are accessible via a disk drive (or computer-readable medium drive), such as the disk drive shown in FIG. 6.

Alternatively, the logic to perform the methods as discussed above, including the method of performing cache-aligned memory access, could be implemented in additional computer and/or machine readable mediums, such as discrete hardware components such as large-scale integrated circuits (LSI's), application-specific integrated circuits (ASIC's), firmware such as electrically erasable programmable read-only memory (EEPROM's); and, electrical, optical, acoustical or other forms of propagated signals (e.g., carrier waves, infrared signals, digital signals, etc.).

What is claimed is:

1. A method of accessing data from a memory comprising:
   masking off a portion of a first memory address;
   accessing a first unit of data corresponding to the first memory address, the first unit of data aligned with a memory boundary line;
   adding a predetermined offset to the first memory address to generate a second memory address;
   accessing a second unit of data corresponding to the second memory address, the second unit of data aligned with a memory boundary line;
   shifting off a section of the first unit of data and shifting off a separate section from the second unit of data; and
   joining the first unit of data and the second unit of data.

2. The method of claim 1 further comprising:
   prior to masking off a portion of the first memory address, generating a second copy of the first memory address;
   masking off a portion of the second copy of the first memory address.

3. The method of claim 2 further comprising:
   after masking off a portion of the second copy of the first memory address, multiplying the second copy of the first memory address by a predetermined factor to generate a first shift value; and subtracting the first shift value from a predetermined value to generate a second shift value.

4. The method of claim 3, wherein shifting off a section of the first unit of data includes shifting the first unit of data by an amount equal to said first shift value; and shifting off a section of said second unit of data includes shifting the first unit of data by an amount equal to said second shift value.

5. The method of claim 4, wherein joining the first unit of data and the second unit of data includes performing a logical OR operation between the first unit of data and the second unit of data.

6. The method of claim 5, wherein said first and second units of data include packed data units having multiple units of data.

7. A method of accessing data from a memory comprising:

masking off a portion of a first memory address;

accessing a first packed data unit corresponding to the first memory address via a MOVQ instruction, the first packed data unit aligned with a memory boundary line;

adding a predetermined offset to the first memory address to generate a second memory address;

accessing a second packed data unit corresponding to the second memory address via a MOVQ instruction, the second packed data unit aligned with a memory boundary line;

shifting off a section of the first packed data unit and shifting off a separate section from the second unit packed data unit via a Pack Shift instruction; and joining the first packed data and the second packed data units via a POR.

8. A computer-readable medium having stored thereon a set of instructions, said set of instruction for accessing data from a memory, which when executed by a processor, cause said processor to perform a method comprising:

masking off a portion of a first memory address;

accessing a first unit of data corresponding to the first memory address, the first unit of data aligned with a memory boundary line;

adding a predetermined offset to the first memory address to generate a second memory address;

accessing a second unit of data corresponding to the second memory address, the second unit of data aligned with a memory boundary line;

shifting off a section of the first unit of data and shifting off a separate section from the second unit of data; and joining the first unit of data and the second unit of data.

9. The computer-readable medium of claim 8 further comprising:

prior to masking off a portion of the first memory address, generating a second copy of the first memory address;

masking off a portion of the second copy of the first memory address.

10. The computer-readable medium of claim 9 further comprising:

after masking off a portion of the second copy of the first memory address, multiplying the second copy of the first memory address by a predetermined factor to generate a first shift value; and subtracting the first shift value from a predetermined value to generate a second shift value.

11. The computer-readable medium of claim 10, wherein shifting off a section of the first unit of data includes shifting the first unit of data by an amount equal to said first shift value; and shifting off a section of said second unit of data includes shifting the first unit of data by an amount equal to said second shift value.

12. The computer-readable medium of claim 11, wherein joining the first unit of data and the second unit of data includes performing a logical OR operation between the first unit of data and the second unit of data.

13. The computer-readable medium of claim 12, wherein said first and second units of data include packed data units having multiple units of data.

* * * * *